Sept. 1, 1953
H. C. EINSTEIN
2,650,859
HYDRAULICALLY OPERATED MECHANISM
FOR RAISING DUMP TRUCK BODIES
Filed Jan. 18, 1950
6 Sheets-Sheet 1
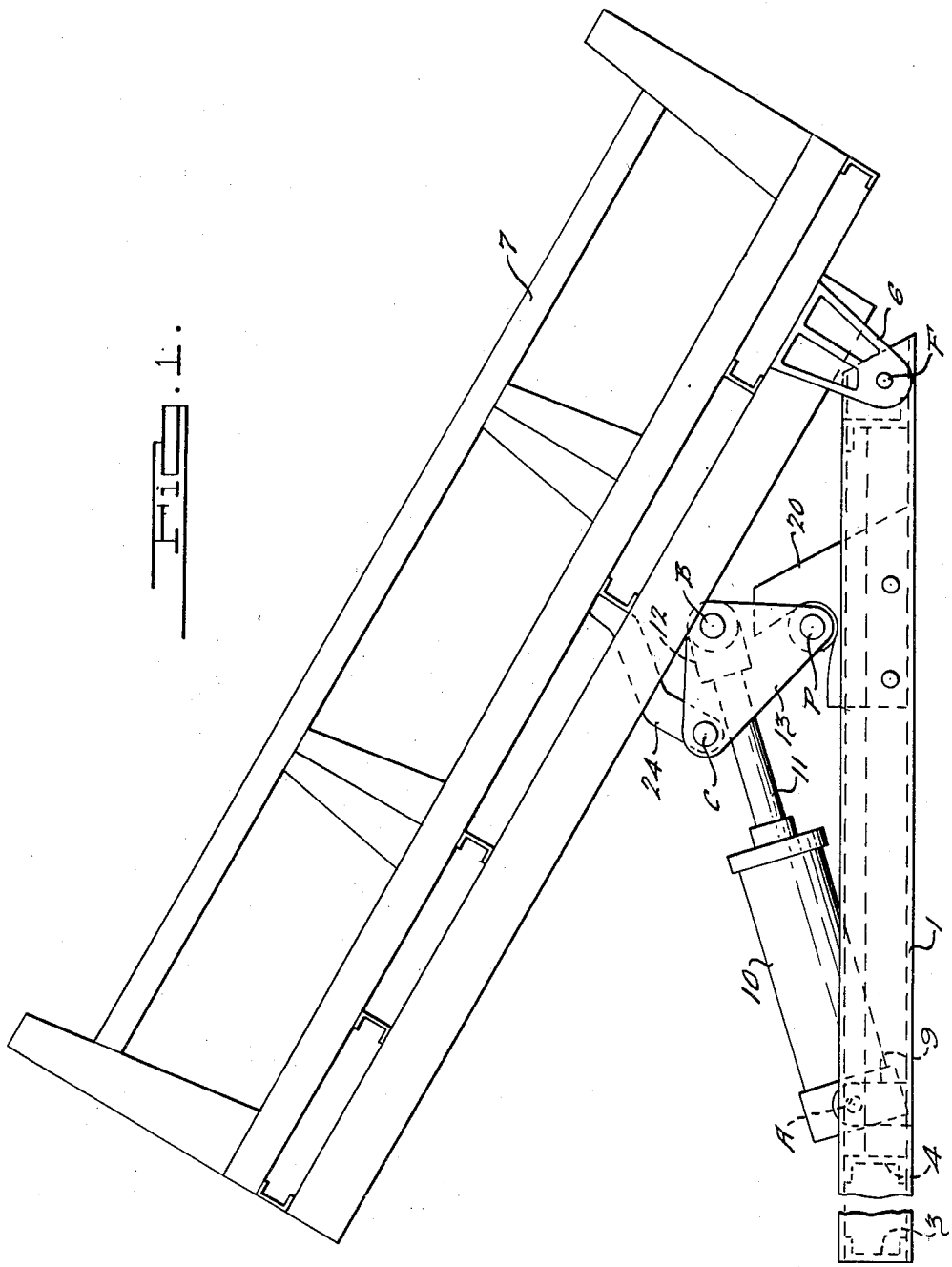
INVENTOR.
Howard C. Einstein.
BY
Everett G. Wright
ATTORNEY.

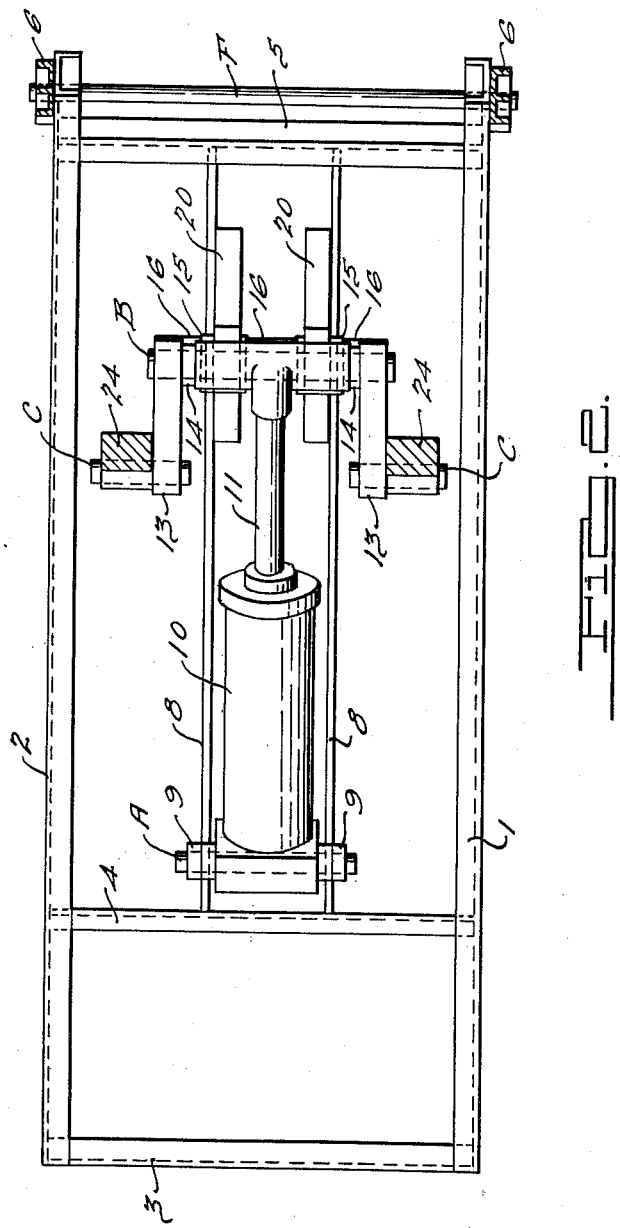

Sept. 1, 1953
H. C. EINSTEIN
HYDRAULICALLY OPERATED MECHANISM
FOR RAISING DUMP TRUCK BODIES
2,650,859
Filed Jan. 18, 1950
6 Sheets-Sheet 3
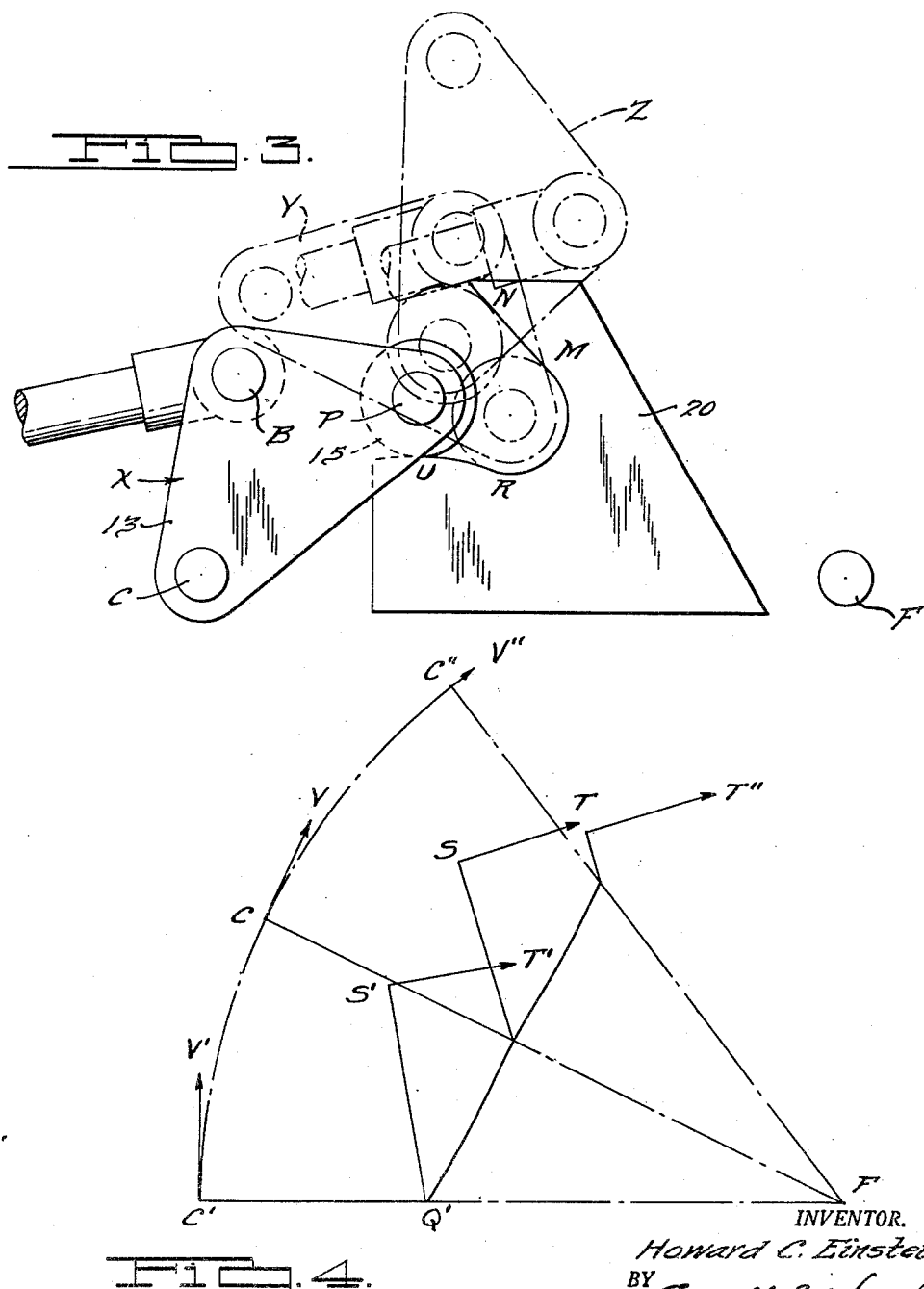
INVENTOR.
Howard C. Einstein.
BY
ATTORNEY.

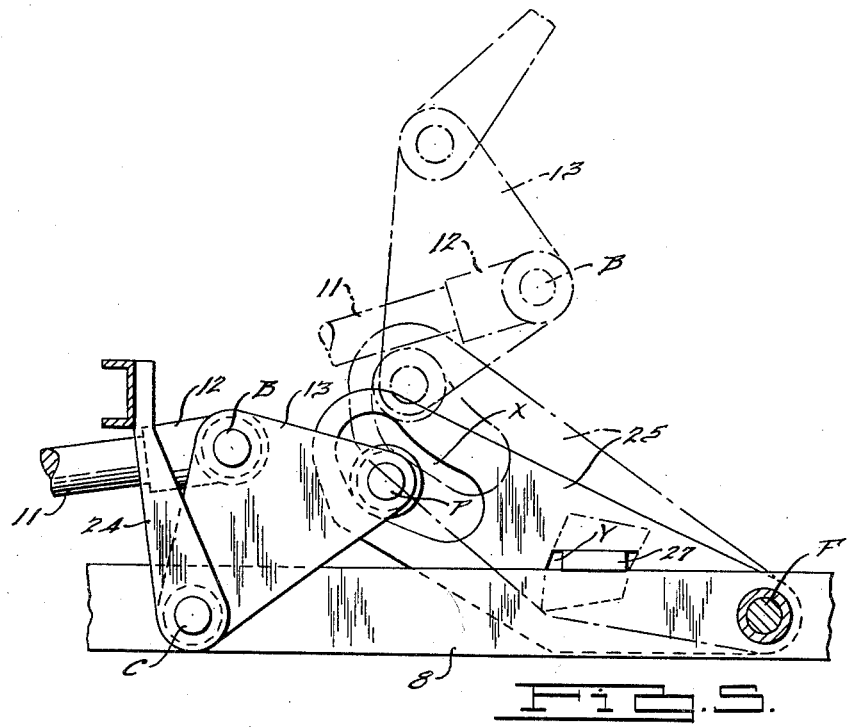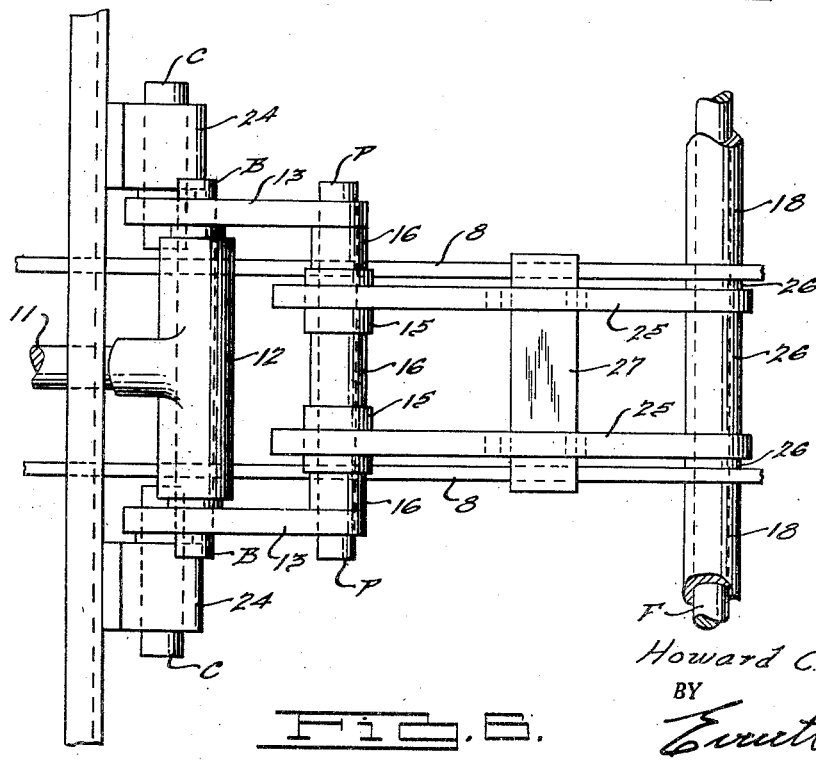

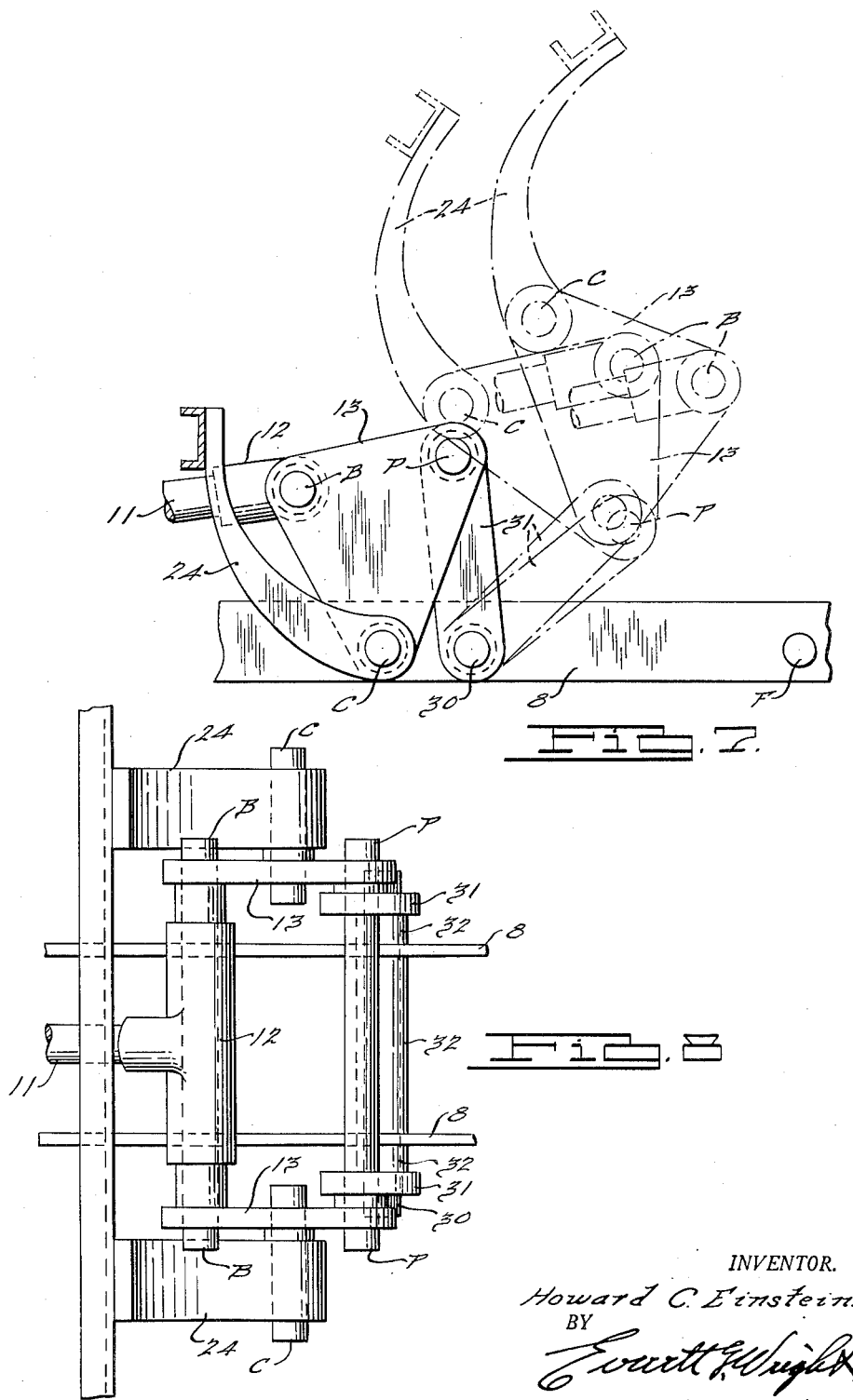

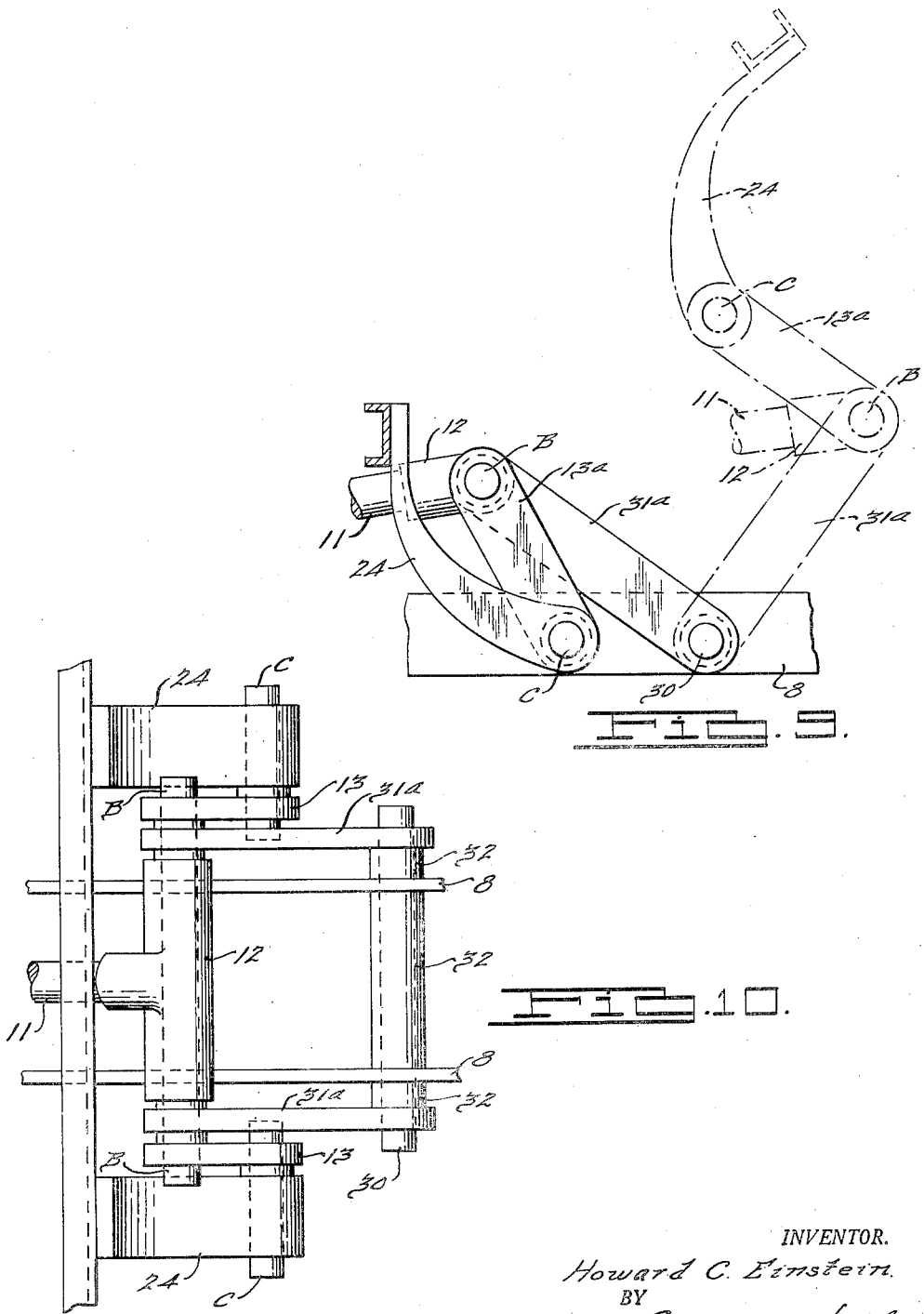

Patented Sept. 1, 1953

2,650,859

UNITED STATES PATENT OFFICE 2,650,859

HYDRAULICALLY OPERATED MECHANISM FOR RAISING DUMP TRUCK BODIES

Howard C. Einstein, Detroit, Mich.; Leo I. Franklin, executor of said Howard C. Einstein, deceased Application January 18, 1950, Serial No. 139,219

5 Claims. (Cl. 298—22)

My invention relates generally to dumping devices, and more particularly to a method and means for dumping a truck body through the actuation of a hydraulic cylinder and piston.

More specifically, a link mechanism is employed which is adapted to transfer or change the direct thrust of a piston operating in a hydraulic cylinder for raising and dumping a body about its hinge. The mechanism continuously controls the relation between the axial motion of the piston and the angular motion of the body for the purpose of effecting various desirable results in the operation of said hoist and an economy of construction.

My invention employs a rigid link, one end of which is pivotally attached to the end of the piston, and the other end of which is pivotally attached to the body and adapted to transfer its motion to said body. If this link were so attached as to prevent its rotation with respect to the body, the thrust applied by the piston at the other end of the link would have the same effect as if the piston were attached directly to the body. Under such conditions, the thrust required to tilt the body would be much greater at the start of the stroke than it would be at the end of the stroke. In order to counteract the changing moment of the load, which change occurs continuously throughout the cycle, a continous controlled rotation of the link respective to the body is required. A total rotation respective to the body of from 40° to 100° is indicated for optimum results. The maximum forces encountered will exceed the minimum obtainable to whatever degree the rotation of the link falls short of the maximum required. By permitting this link to rotate with respect to the body and by controlling this rotation throughout the dumping cycle, a control of the force applied by the piston is effected. The means which I employ to control the rotation is unique in that it is effective throughout or substantially throughout the entire dumping cycle, and by virtue of its being effective throughout all or substantially all of said cycle, it results in a maximum thrust for a given load which is substantially less than is obtainable with other control means of this type. As will appear in subsequent description, my mechanism provides for substantially lower maximum forces than are obtainable with any other mechanisms which offer an equivalent simplicity of construction and which can be contained within the space employed.

Accordingly, the main objects of my invention are: to provide a mechanism actuated by a hydraulically operated piston for continuously controlling the dumping of a body throughout its entire angle of tilt; to provide a mechanism for controlling the dumping of a body by a hydraulically actuated piston employing a low initial force which is applied uniformly or with a minimum variation throughout the dumping operation; to provide a link connection between a point in rectilinear motion and one in rotary motion operating in conjunction with control means which reverse the moment of thrust around one end of said link; to provide a link or links and means for controlling their relative movement when a force is applied thereto resulting in the application of a substantially constant force throughout the raising movement of a truck body as the raising movement progresses; and, in general, to provide a mechanism for raising a truck body which is simple in construction, positive in operation, and economical of manufacture.

Other objects and features of novelty of the invention will be specifically pointed out or will become apparent when referring, for a better understanding of the invention, to the following description, taken in conjunction with the accompanying drawings, wherein:

Figure 1 is a view in elevation showing a body and hoist in a partially raised position;

Fig. 2 is a broken plan view of the hoist shown in Fig. 1, with the body removed for the purpose of clarity;

Fig. 3 is a broken enlarged elevational view of the dumping mechanism illustrated in three different positions of the dumping cycle;

Fig. 4 is a force diagram showing the changing forces at different points in the dumping cycle;

Fig. 5 is a view of structure, similar to that illustrated in Fig. 3, showing another form of the invention;

Fig. 6 is a plan view of the structure illustrated in Fig. 5;

Fig. 7 is a view of structure, similar to that illustrated in Fig. 5, showing a still further form of the invention;

Fig. 8 is a plan view of the structure illustrated in Fig. 7;

Fig. 9 is a view of structure, similar to that illustrated in Fig. 7, showing another form which the invention may assume; and Fig. 10 is a plan view of the structure illustrated in Fig. 9.

Referring to Figs. 1 and 2, two longitudinal rail members 1 and 2 are rigidly connected by cross members 3, 4 and 5 to form a subframe of the hoist. A shaft F is mounted between the rail members 1 and 2 near the rear end thereof. A pair of hinges 6 is rotatably mounted on shaft F and is fixedly attached to a dump body 7 to permit the tilting of the body around the axis of shaft F.

Two spaced longitudinally extending members 8 are disposed between the cross members 4 and 5 and are fixedly attached thereto. Bearing members 9 are secured to the members 8 for pivotally supporting the trunnions A of a cylinder assembly 10 in a plane parallel to the subframe. A piston and piston rod assembly 11 are adapted to reciprocate within cylinder assembly 10. A crosshead 12, secured to the end of the piston rod 11, has a transverse aperture for receiving a pin B which is rotatable therein. Two triangular shaped control links 13 are secured in fixed relation to each end of the pin B at an apex thereof. Collars 14 are mounted on the pin B to appropriately position the control links 13 with respect to the crosshead 12. A shaft P is mounted at another apex of the control links 13 in fixed relation thereto. Rollers 15 are rotatably mounted on shaft P and appropriately positioned thereon by collars 16. Two studs C are secured in fixed relation on control links 13 at the third apex thereof. The studs C engage suitable apertures located in the brackets 24.

Cam plates 20 of predetermined contour are attached to the longitudinally extending members 8 in position to be engaged by the rollers 15.

Referring to Figs. 1, 2 and 3, the action of the mechanism is as follows. When the lift valve is operated, fluid from the pump driven by the power take-off from the truck engine is admitted to the cylinder assembly 10 against the piston and piston rod assembly 11. The fluid provides an axial thrust which tends to increase the distance between pins A and B, tending to rotate the control links 13 clockwise from the starting position X illustrated in Fig. 3. This rotation brings the rollers 15 into engagement with the predetermined cam surfaces of the respective cam plates 20. Since the rotation of the control links 13 about shaft C is checked and controlled by the engagement of the rollers 15 with the cam surfaces, the thrust produces a lifting action on pin C and thus raises the body through the brackets 24 which are an integral part thereof. Since the pin B is rotating about the pins C at the same time that the pins C are rotating about the shaft F, the motion of the pin B is the same as if it were rotating about some imaginary point Q' (see Fig. 4), which point is termed an instant center. Thus, the thrust along the cylinder axis of an amount shown graphically as S'—T' in Fig. 4, will produce a lifting force C'—V' at the point C'. The ratio of these two forces is, of course the ratio of the theoretical arms S'—Q' and C'—Q', being perpendiculars drawn from the instant center to the directions of thrust. Since the shape of the cam surface determines the direction of motion and thus determines the location of the instant center, it is apparent that the curve of the cam surface can be predetermined to obtain whatever ratio between the forces may be desired.

At the motion continues, an intermediate position Y is attained, in which position a line drawn between the pins C and B makes the same angle with the horizontal as a line drawn between pins A and B. As the cycle progressed up to this intermediate position, the rollers engaged successive points on the cam surface between U and R. At this position the thrust is along the line connecting C and B, and consequently there is no moment of rotation in the control link induced thereby. Further thrust along the piston rod tends to bring the roller into contact with the cam surface at point M. This counter-thrust will induce a further clockwise motion of pin C about pin B and thus induce a further lifting effect. When the end of the cycle has been reached, the control links 13 have been rotated to the position Z, with a consequent positioning of shaft C at the topmost position shown. During this portion of the cycle, the rollers have successively engaged points on the cam surface between M and N.

As previously stated, the predetermination of the curved surfaces between U and R and M and N predetermines the locus of instant centers as shown by the line Q'—P—Q'' in Fig. 4. It will be noted in Fig. 4 that for successive equal values of the thrust S'—T', S—T, and S''—T'', we obtain successively reducing values of the lift force V'—C', V—C, and V''—C''. This in general reflects the true condition of the successively lesser forces required to effect tilting as the angle of tilt increases. As previously stated, a predetermination of the theoretical line Q'—P—Q'' can be made to obtain whatever successive ratios of forces is desired and the curvature of the cam surfaces can then be established to effect this result.

The foregoing is a description of a mechanism in which a rigid link connection is made between a point B in rectilinear motion with respect to a cylinder and a point C in angular motion wherein points B and C move in controlled rotation with respect to each other and wherein the means for controlling said rotation is designed to maintain, at a minimum, the forces required for performing a given amount of work. The design is unique in that rotation of the nature and extent shown is mandatory if minimum-maximum forces are to be obtained and in that rotation of this nature and extent is not, to my knowledge, employed by any other mechanism for the dumping of bodies mounted on truck chassis. Demonstration of the above will appear subsequently in this specification.

It is my intention to show that whereas the motion obtained is unique, there are a multiplicity of ways for effecting the same or substantially the same motion and hence the same or substantially the same desired results. Therefore, the design shown in Figs. 1 to 3 inclusive must be considered as one illustrating a general principle only.

In Figs. 5 and 6, I show a variation in the motion control means which can be proportioned to approximate very closely the optimum force conditions obtained in the means shown in Figs. 1 to 3, and which offers certain advantages where space conservation is desired. In these and subsequent drawings for the purpose of clarity in presentation, I am showing only enough parts to illustrate the design deviation from that previously shown.

In Figs. 5 and 6, the two cam plates 20 which controlled the path of the rollers 15 are deleted. In their place, as a path control means, there are two arms 25 rotatably mounted on shaft F and transversely positioned thereon by means of collars 26. In each of these arms there is a cammed slot X adapted to engage rollers 15, respectively. There is a stop bar 27 fixedly positioned on longitudinal members 8. This bar passes through slots Y in arms 25 engaging surfaces of such slots to act as a stop to limit their otherwise free rotatability about shaft F.

Thus, as force is applied through the piston to point B, the induced clockwise rotation of links 13 brings the rollers 15, mounted thereon, into engagement with the lower cammed surfaces in slots X in arms 25. Since, in the starting position, any downward motion of arms 25 is checked by stop bar 27, these cammed surfaces function to control the rotation of links 13 in exactly the same manner as the surfaces of plates 20 in the previous description.

This action will continue until the intermediate position is reached, that is, the position in which a line between C and B makes the same angle with the horizontal as the axis of the piston. At this point further thrust at point B will cause the rollers to engage the upper surfaces of cammed slots X, thus tending to lift arms 25 and rotate them about shaft F. When the lower surfaces of slots Y in arms 25 engage stop bar 27, further clockwise rotation of arms 25 is prevented. Further thrust at point B causes the rollers to engage with and travel along the upper surfaces of cammed slots X in exactly the same manner as they engaged the upper surfaces of cammed plates 20 in the previous description.

It will be noted that in cases where the selection of dimensions of the mechanism shown in Fig. 1 might result in cammed surfaces on plates 20 that would extend above the desired level of the body floor, the condition can be ameliorated by the employment of the control mechanism illustrated in Fig. 5. In this latter case the upper cammed surface is located in a lower position at the start of the stroke than the position required to effect its proper functioning and is only raised into its functioning position after the body has been raised out of interference therewith.

It should be noted that, to effect a control of the rotation of links 13, since point C on said links is predeterminably positioned throughout the stroke, it is only necessary to control the motion of any other point on said links. It is, of course, mechanically necessary to select a point which is susceptible of control by mechanical means in the path desired. Obviously, there are certain points, the selection of which will produce optimum control means. If the cam path employed on plates 20 were an arc of a circle, a rigid link could be substituted which would produce the same motion. This application is illustrated in Figs. 7 and 8.

In this arrangement the cam plates 20 and the rollers 15, as illustrated in Figs. 1 to 3, are deleted.

A shaft 30 is rotatably mounted in longitudinal members 8. Two links 31 are fixedly mounted on the ends of shaft 30 in the positions shown. Collars 32 are mounted on shaft 30 to position it transversely with respect to longitudinals 8. The other ends of links 31 are pivotally mounted on shaft P.

As pressure is applied at point B, inducing a clockwise rotation of links 13 about point C, the motion of point P will be checked and controlled by links 31. This will result in a lifting action against the body in exactly the same manner as in the foregoing examples. The rotation of the link 13 will be exactly the same as it would be if the cammed surfaces of plates 20 in the foregoing description were arcs of circles with their centers at the center of shaft 30.

When the rotation of the links 13 has progressed to a point when a line drawn between C and P makes the same angle with the horizontal as a line drawn between C and the hinge point F, the mechanism will have reached a second position as illustrated by dotted lines in Fig. 7. At this point links 31 will have swung through their maximum arc and will be in their extreme position to the right. Further thrust at point B will cause links 31 to swing to the left, retracing a portion of the arc of travel. It is apparent that the effective cam path is a circular arc distinctly different from the cam path illustrated in Fig. 1. However, it has already been stated that any of a multiplicity of points on links 13 can be selected as a basis for effecting controlled rotation. It can be demonstrated that, with the appropriate selection of dimensions, a control of motion of the type illustrated in Fig. 7 can result in a maximum deviation from optimum conditions of approximately 15% or less, an approach to the optimum which is not obtainable with any other mechanism, known to me, of a comparable simplicity.

In Figs. 9 and 10 I have illustrated an alternate motion control means which is in effect only a special case of the more general application illustrated in Fig. 7. In this case, the distance between P and B becomes zero. This is tantamount to saying that a triangular link is employed in which one side of the triangle is zero and hence the triangle becomes a straight line. These triangular links 13 become simple links 13a, shaft P is eliminated since shaft B performs the function of shaft P as well, and links 31a are pivotally mounted and positioned on shaft B in a similar manner to their mounting on shaft P in the immediately foregoing mechanism described. It must be noted that in this arrangement there is no reversal of the travel of links 13a since the extreme dumping position (shown in dotted lines) is also the extreme position of travel of links 13a.

In operation, when fluid is directed to the cylinder assembly 10, the piston rod assembly is forced outwardly thereof to effect a rotation of triangular control links 13 about a point on a tilting member. A rigid means is connected to the basic frame work and disposed to engage a point on the control links to set up a counteracting moment to the moment induced by the piston rod assembly and to permit motion of the point in a predetermined manner. The constraining action of the counteracting moment induces a lifting force on the tilting member at the point of connection of the triangular links thereto, causing a tilting action.

The disposition of the various members is such that the angular velocity of the piston rod crosshead is greater than that of the tilting member at the start of the tilting action and such that the difference of these angular velocities becomes increasingly less during the cycle until they become equal, after which the angular velocity of the crosshead becomes increasingly greater up to the end of the stroke, resulting in a thrust which remains substantially constant as the moment of the load decreases. Therefore, the body is dumped while a uniform or a predetermined variation of pressure is applied throughout the piston assembly operation. This is made possible by use of a relatively greater amount of piston stroke to raise the body through a portion of its angular travel from the position X of Fig. 3 to the position Y thereof. This leaves a much shorter length of stroke to raise the body through the remaining portion of its angular travel from the position Y to position Z.

What is claimed is:

1. A mechanism for tilting a dump truck body about its hinge axis on the frame of a truck including, in combination, a cylinder pivotally mounted on said frame, a piston rod in said cylinder movable therefrom toward the rear of the frame, a pair of triangular control links pivoted to said body at one corner of the triangle, means for pivoting the piston rod to another corner of the triangular control links, and a pair of cam elements having cam surfaces at an angle to each other secured to said frame and engaging the third corner of the triangular control links for controlling the movement of the third corner in planes at an angle to each other.

2. A mechanism for tilting a dump truck body about its hinge axis on the frame of a truck including, in combination, a cylinder pivotally mounted on said frame, a piston rod in said cylinder movable therefrom toward the rear of the frame, a pair of triangular control links pivoted to said body at one corner of the triangle, means for pivoting the piston rod to another corner of the triangular control links, and a pair of cam elements secured to said frame and engaging the other corner of the triangular control links, said cam elements having reversely angled surfaces sloping downwardly from the horizontal and then upwardly and reversely to extend over a portion of said downwardly sloping portion.

3. A mechanism for tilting a dump truck body about its hinge axis on the frame of a truck including, in combination, a cylinder and piston assembly having means by which it is adapted to be mounted on a truck frame, a piston rod extensible from said cylinder, a pair of triangular links having one corner adapted to be pivoted to the body, means for pivoting another corner of said links to said piston rod, rollers mounted on the third corner of said links, and cam plates engageable by said rollers and adapted to be secured to the frame, said cam plates having two reversely sloping areas one for controlling the rotation of the links about one corner thereof to a predetermined point in the dumping cycle, the other for controlling said rotation through the balance of said cycle.

4. A mechanism for tilting a dump truck body about its hinge axis on a frame for a truck including, in combination, a cylinder pivotally mounted on said frame, a piston rod in said cylinder movable therefrom toward the rear of the frame, a pair of triangular control links pivoted to said body at one corner of the triangle, means for pivoting the piston rod to another corner of the triangular control links, and paired cams having paired faces at an acute angle to each other for engaging the other corner of the triangular control links to cause the corner to reverse its direction of movement while controlling the bodily movement and the movement of revolution of the triangular control links throughout the entire dumping cycle.

5. A mechanism for tilting a dump truck body about its hinge axis on a frame for a truck including, in combination, a cylinder pivotally mounted on said frame, a piston rod in said cylinder movable therefrom toward the rear of the frame, a pair of triangular control links pivoted to said body at one corner of the triangle, means for pivoting the piston rod to another corner of the triangular control links, and paired cams having paired faces at an acute angle to each other for engaging the other corner of the triangular control links to cause the corner to travel toward the hinge point during the initial movement of the control links and then reverse and travel away from the hinge point during the latter part of the dumping cycle.

HOWARD C. EINSTEIN.

References Cited in the file of this patent

UNITED STATES PATENTS

| Number | Name | Date |
| --- | --- | --- |
| 2,094,521 | Biszantz | Sept. 28, 1937 |
| 2,097,555 | Anthony | Nov. 2, 1937 |
| 2,136,663 | Anthony | Nov. 15, 1938 |
| 2,144,599 | Anthony | Jan. 17, 1939 |
| 2,172,138 | Harley | Sept. 5, 1939 |
| 2,232,230 | Gruber | Feb. 18, 1941 |
| 2,454,481 | Rumsby | Nov. 23, 1948 |